United States Patent [19]

Owsen

[11] 4,416,174
[45] Nov. 22, 1983

[54] AUXILIARY SUPPORT FIXTURE FOR A STEADY REST

[75] Inventor: Paul J. Owsen, Traverse City, Mich.

[73] Assignee: Century Specialties, Inc., Traverse City, Mich.

[21] Appl. No.: 276,729

[22] Filed: Jun. 24, 1981

[51] Int. Cl.³ .................. B23B 3/36; B23B 25/00
[52] U.S. Cl. ........................ 82/38 R; 51/238 S
[58] Field of Search ............... 82/38 R, 39, 35; 51/238 S

[56] References Cited

U.S. PATENT DOCUMENTS

| 301,185 | 7/1884 | Tyler et al. | 82/38 R |
| 1,637,794 | 8/1927 | Williams | 82/35 |
| 3,091,985 | 6/1963 | Whalen | 82/38 R |
| 3,320,839 | 5/1967 | Dinsmore | 82/39 |
| 4,265,150 | 5/1981 | Burford | 82/38 R |

FOREIGN PATENT DOCUMENTS 474393 4/1936 United Kingdom ............... 82/35

Primary Examiner—Leonidas Vlachos
Assistant Examiner—Jerry Kearns
Attorney, Agent, or Firm—Krass, Young & Schivley

[57] ABSTRACT

An auxiliary support device for a workpiece is connected to a bracket mounted on a side face plate of a steady rest. The support device includes a member extending from the end of the steady rest for abutting the workpiece diametrically opposite the machine tool to provide additional backup forces during machining operations. Preferably, provision is made for adjusting the angle of the support device relative to the workpiece and for moving the abutment member in unison with the fingers of the steady rest.

6 Claims, 2 Drawing Figures

U.S. Patent    Nov. 22, 1983    4,416,174

AUXILIARY SUPPORT FIXTURE FOR A STEADY REST

BACKGROUND OF THE INVENTION

This invention relates to machine tools and, more particularly, to steady rests adapted for use in machining operations.

Steady rests have been used for many years in connection with machining operations. They typically employ three hydraulically or pneumatically operated finger rollers which are adapted to concentrically support a shaft-like workpiece to provide evenly distributed support for it. The steady rest resists the tendency of the machine tool to throw the workpiece off center during machining by turning, grinding or the like. Exemplary steady rests are shown in U.S. Pat. Nos. 3,234,829 and 3,320,839 to Dinsmore, U.S. Pat. No. 2,547,529 to Lichtenberg; and U.S. Pat. No. 2,160,378 to Balsiger.

In the conventional steady rest in which the fingers are equally spaced about the workpiece, most commonly used tools must be spaced off center with respect to the steady rest since interference would result if the tool was located diametrically opposite the fingers. Accordingly, even in the best steady rest there still remains a tendency for the workpiece to be moved out of alignment by the forces acting upon it from the machine tool. In such instances uniform precision machining operations along the length of the workpiece are difficult to obtain.

SUMMARY OF THE INVENTION

According to the present invention an auxiliary support fixture for a steady rest is disclosed which provides an additional support member for abutting the workpiece diametrically opposite the machine tool. Since the supporting device is exactly opposite the machine tool, the workpiece is held in a uniformly spaced relationship with the tool thereby permitting precision machining operations.

In the preferred embodiment the support device is connected to a bracket mounted on one faceplate of the steady rest. The angle of the abutment member relative to the workpiece may be adjusted by way of an arcuate slot in the bracket to which the support device is connected. Means are also provided for moving the abutment member into contact with the workpiece in unison with the fingers of the steady rest. In the preferred embodiment the end of abutment member remains stationary after abutting the workpiece to provide uniform backup forces and is used instead of conventional rollers which may be slightly out of round.

BRIEF DESCRIPTION OF THE DRAWINGS

These and other advantages of the present invention will become apparent upon reading the following specification and by reference to the drawings in which.

DESCRIPTION OF THE PREFERRED EMBODIMENT

Figure 2:
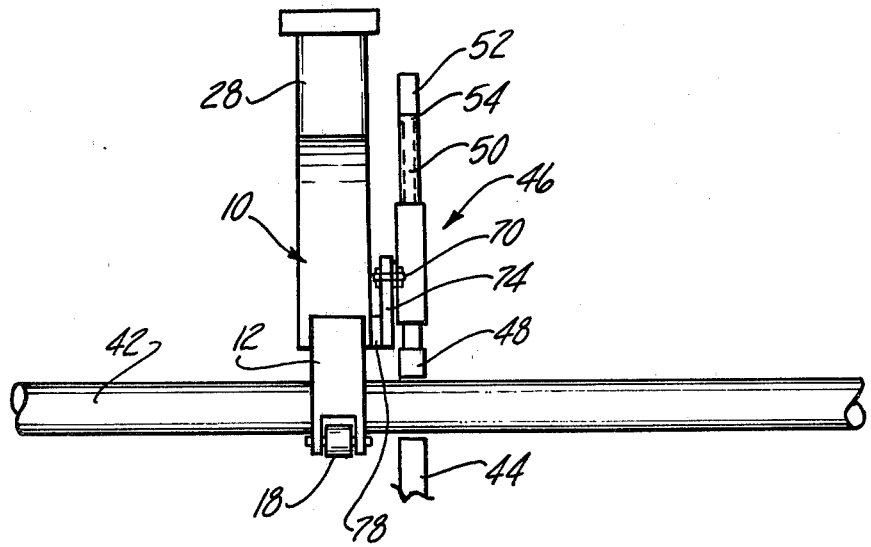
FIG. 2 is a top plan view showing the use of the present invention in a typical machining operation.

The present invention is employed in connection with a conventional steady rest 10. Steady rest 10 employs a set of three movable fingers 12, 14 and 16 having rollers 18, 20 and 22, respectively, on the ends thereof. A suitable housing having opposing face plates 24, 26 contains conventional linkage mechanisms connected between the inner portions of fingers 12-16 and a pneumatic or hydraulically activated piston (not shown) contained within cylinder 28. Cylinder 28 includes two fittings 30, 32 which are coupled by way of flexible hoses 34, 36, respectively, to a fluid source 38. As is well known in the art, when fluid source 38 supplies pressurized fluid through hose 36 the piston will move in a right to left direction causing the fingers 12-16 to extend further from the end 40 of the steady rest 10 until the rollers 18-24 are equally spaced and engaged with a workpiece such as shown in FIG. 2. Conversely, pressurized fluid through hose 34 will cause the fingers 12-16 to open and retract.

A conventional work station using steady rest 10 is shown in FIG. 2. A machine tool 44 spaced from the fingers 12-16 is used to perform a designated machine operation on a rotating workpiece 42. Machine tool 44 may comprise, for example, a grinding wheel or a cutter in a lathe. Either the workpiece 42 remains stationary and the machine tool 44 moves longitudinally along the length of workpiece 42 or the tool 44 remains stationary and the workpiece 42 is moved longitudinally. In both cases the spacial relationship between machine tool 44 and steady rest 10 remains the same. For example, in a cutting operation in which the workpiece 42 is rotated but remains longitudinally stationary, tool 44 and steady rest 10 will be coupled to a reciprocating carriage which moves up and down the length of the workpiece 42. Sometimes the rest is referred to as a follow rest in the latter example. The term steady rest as used herein is meant to include both situations.

The present invention is directed to the auxillary support fixture 46 which cooperates with steady rest 10 to provide additional backup support for the workpiece 42 during the machining operation. Fixture 46 employs an abutment member 48 arranged to engage workpiece 42 diametrically opposite machine tool 44. In the preferred embodiment member 48 presents a stationary support surface for engaging workpiece 42 during the machining operation. Member 48 may be a piece of wood, relatively rigid fiber, or plastic capable of providing uniform pressure to workpiece 42. While member 48 may take the form of a roller it has been found to be preferable to use a stationary backup surface especially in grinding operations. This eliminates the possibility that the roller may be out of round which would vary the backup pressure applied to workpiece 42 during the machining operation and cause a nonconcentric removal of material.

Member 48 is connected to one end of a movable piston rod 50 which is slidably mounted in a cylinder 52. The opposite end of piston rod 50 is connected to a piston head 54. Fittings 56 and 58 are provided on either side of piston head 54. Fitting 56 is connected to the same side of fluid source 38 so as to receive pressurized fluid whenever fitting 30 of steady rest 10 is provided with fluid. Similarly, fitting 58 is connected for receipt of the pressurized fluid from source 38 whenever fitting 32 of the steady rest receives such fluid. In the drawings, fittings 56 and 58 are schematically shown as being coupled by hoses 60 and 62 to hoses 34 and 36, respectively. However, other ways of providing the necessary connections will be obvious to one skilled in the art. Thus, it can be appreciated that piston rod 50 and thus abutment member 58 moves in unison with fingers 12-16 of steady rest 10. In such manner, member 48 and fingers 12 are moved to or from workpiece 42 under the control of a single fluid source 38.

Cylinder 52 fits through and is connected to a generally rectangular sleeve 64. Sleeve 64 includes two tongue portions 66 and 68 which have openings therein for receiving suitable nut and bolt assemblies 70 and 72, respectively.

Pursuant to another aspect of this invention provision is made to adjusting the angular position of member 48 with respect to the workpiece 42. This is provided by way of bracket 74 which includes an arcuate slot 76 curving concavely with respect to the workpiece engagement area. The ends of bracket 74 are connected to faceplate 26 by way of spacer blocks 78 and 80. Other means for mounting bracket 74 may be readily provided. The provision of the arcuate slot 76 in bracket 74 permits the major longitudinal axis of the supporting fixture to be angularly adjusted to accomodate different angles of presentation of tool 44 to workpiece 42. In such manner, abutment member 48 will remain diametrically opposite tool 44 regardless of the angle in which tool 44 engages workpiece 42. The adjustment can be readily made by loosening bolts 70, 72, moving the fixture along slot 76 to the desired angle, and retightening the bolts. Thus, abutment member 48 is effectively rotated about the workpiece receiving axis of the steady rest fingers.

Figure 1:
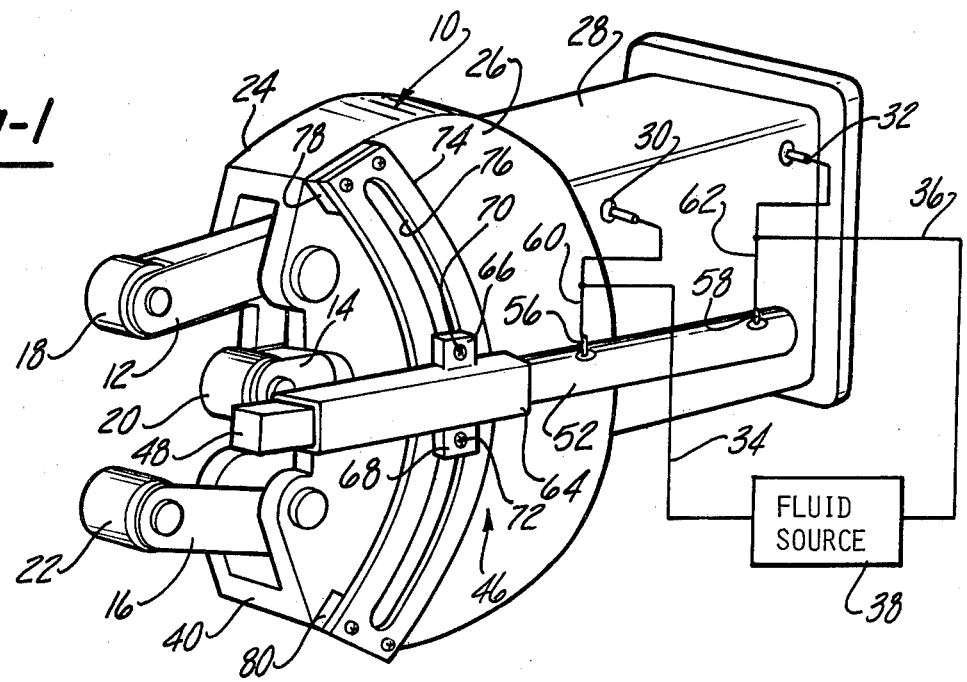
FIG. 1 is a perspective view of the preferred embodiment of the present invention.

FIG. 1 shows the steady rest and support fixture 46 in a retracted position so that workpiece 42 can be easily placed into position. The angle of the support fixture 46 is then adjusted as described above so that it will be diametrically opposite to machine tool 44 when it engages workpiece 42. When fluid source 48 simultaneously activates piston cylinders 28 and 52 the steady rest fingers 12-16 and abutment member 48 move in unison to engage the workpiece as shown in FIG. 2. Hence, it can be appreciated that the present invention cooperates with steady rest 10 to provide even better backup support for workpiece 42 to thereby hold it in a uniform spaced position with respect to machine tool 44 during the machining operations. The auxiliary support fixture 46 is easy to use, requires little maintenance and may be manufactured relatively inexpensively. Other advantages of the present invention will become apparent to one skilled in the art upon a study of the specification, drawings and the following claims.

I claim:

1. An auxiliary support fixture for a steady rest having a plurality of movable fingers extending from one end thereof between opposing faceplates, operative to be moved by a pneumatically operated piston for engaging a workpiece to be machined by a tool, said fixture comprising:

a bracket mounted on one faceplate of the steady rest, said bracket including an arcuate slot therein which is concave with respect to the end of the steady rest;

an elongated cylinder containing a pneumatically operated piston;

an abutment member connected to one end of the piston, said abutment member including a stationary end face for engaging a workpiece;

means for connecting said cylinder to the slot in the bracket whereby the angle of the longitudinal axis of the cylinder may be adjusted; and means for connecting said pistons of the steady rest and support fixture to a common fluid source so that said abutment member and steady rest fingers move in unison, with the abutment member being adapted to engage the workpiece diametrically opposite the machine tool to provide additional backup support for the workpiece during machining operations.

2. In a steady rest having a housing with opposing side faces and a front end, a plurality of fingers extending from the front end and lying generally in a plane parallel to the side faces of the housing, said first actuator means for automatically moving the fingers into clamping engagement with a workpiece, said fingers being spaced equidistantly about an axis of the workpiece for supporting same while the workpiece is machined by a tool offset from the plane of the fingers and spaced from the steady rest housing on an opposite side of the workpiece, the improvement comprising:

an auxiliary support fixture means for providing additional backup force to the workpiece diametrically opposite the tool, said fixture including an elongated abutment member located outside of the steady rest housing and having a workpiece engaging end portion extending from said front end of the steady rest housing from which said fingers extend; means for connecting the abutment member to the steady rest housing so that its workpiece engaging end portion is offset from the plane of the fingers by substantially the same distance as the tool is offset therefrom; and means for longitudinally adjusting said abutment member to abut its end portion against the workpiece diametrically opposite the tool to provide extra backup support during machining and angular adjustment means for adjusting the angle of the longitudinal axis of said abutment member relative to the workpiece to thereby maintain a diametrically opposing relationship between the member axis and various circumferential positions of the tool relative to the workpiece, said angular adjustment means including a bracket mounted on a side face of the steady rest housing, said bracket including an arcuate slot which is concave with respect to said end of the steady rest, and means for slidably mounting said abutment member to the slot.

3. The improvement of claim 2 wherein said end portion of the abutment member presents a stationary surface for engaging the workpiece.

4. The improvement of claim 2 wherein said longitudinal adjustment means includes:

second actuator means for moving said abutment member in a longitudinal direction to selectively engage the workpiece.

5. The improvement of claim 4 wherein said first and second actuator means are arranged to move the fingers and abutment means in unison.

6. The improvement of claim 5 wherein said first and second actuator means include pneumatically operated pistons controlled by a common source.

* * * * *